Feb. 24, 1931.          G. C. THOMAS, JR          1,793,879
CABLE CONNECTER
Filed July 26, 1926
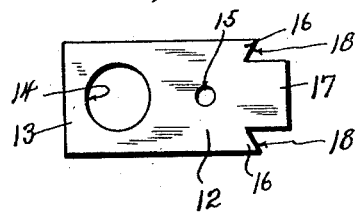
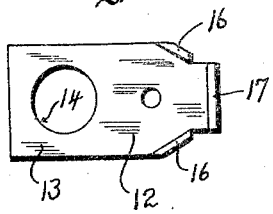
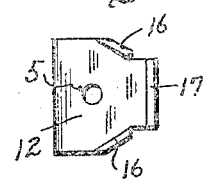
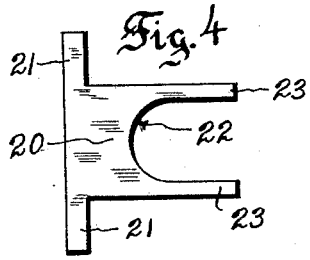
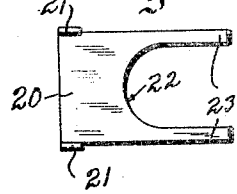
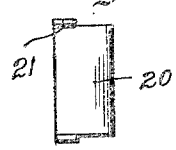
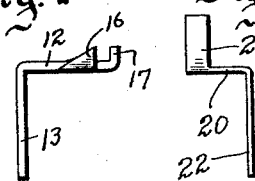
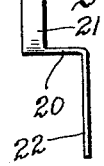
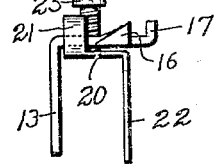
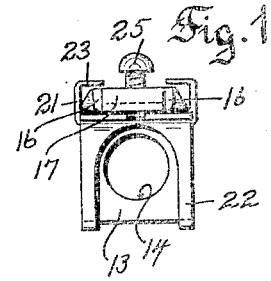
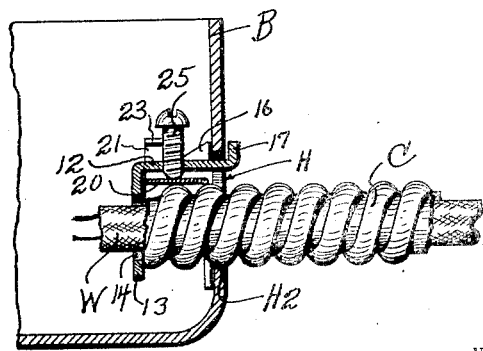
INVENTOR
George C. Thomas, Jr.
BY
Bohlber & Ledbetter
ATTORNEYS Patented Feb. 24, 1931

1,793,879

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed July 26, 1926. Serial No. 124,816.

This invention relates to cable box and connecting means and particularly to improved cable connecters for attaching cable to electric fixture boxes and the like.

An object of the invention is to produce an improved cable connecter of the type which leaves exposed a part of the box hole edge and which is capable of anchoring itself and a cable to said exposed part of a box hole edge without screw fastening means directly connected with the box; and to combine therewith improved box hole edge abutments by which the connecter anchors itself in a box hole.

A further object of the present invention is to combine an improved cable bearing clamp plate with the connecter and to provide means by which this cable clamp is movably carried by the connecter, and to provide operating means carried by the connecter which reacts from the stationary cable to anchor the connecter to the box hole edge and to simultaneously grip the cable against the exposed box hole edge.

Other objects and improvements are set forth in the specification describing an example of the invention.

The accompanying drawings show an example of the invention serving to explain its principles, construction, and mode of application to an electric fixture box.

The first three figures show a flat plate stamping from which a main part of the connecter is made. Figure 1 is a plan view of the connecter plate before subjecting it to bending operations, Figure 2 being a similar view but having its end corners and an end tongue between the corners struck up to provide box hole edge anchorage means, and Figure 3 shows a part of the connecter plate bent at right angles to complete the structure of this part.

Figures 4 to 6 inclusive show the cable clamp and the manner of forming it. Figure 4 is a plan view of the cable clamp stamping before fashioning it into final form. Figure 5 being a plan view of the cable clamp stamping with its retaining arms bent at right angles to the main body thereof, and Figure 6 is a view of the body of the clamp plate bent at right angles to the main portion thereof.

Figures 7 and 8 show the foregoing two main parts, namely, the connecter plate and the cable clamp placed in spaced position and ready to be assembled.

Figures 9 and 10 show assembly views of the connecter plate and cable clamp together with operating means, the first view being a side elevation and the latter view being an end elevation.

Figure 11 shows the connecter, cable and box assembled with all parts in final anchored position.

Referring further to the drawing, an electric fixture box B is provided with cable and connecter receiving holes H to receive the cable C and this improved connecter is mounted in the box hole H and operates to simultaneously anchor itself and the cable in the box hole and to the edge thereof by actuation of a single operating means.

The first three figures show the manner of producing the connecter plate which comprises a flat stamping 12 which may have an end 13 provided with a wire passage 14. The connecter plate 12 may be provided with a threaded screw hole 15 for the reception of a screw when a screw is employed as operating means.

One end or side of the connecter plate is made with corners 16 and a tongue 17 projecting centrally between and beyond the corners 16. The tongue is sufficiently narrow to fit into a box hole and overreach the edge thereof. The corners may to advantage have a protruding angular edge 18 by which to increase their overlapping distance with respect to a box hole edge when mounted in a box hole. The projecting tongue 17 and angular corners 16 are struck up or bent up to provide spaced abutment means on the connecter adapted to overlap both sides of a box hole edge and thereby establish the connecter against longitudinal displacement in a box hole.

The connecter plate 12 is fashioned into ultimate form, as shown in side elevation in Figure 7, by subjecting it to a right angular bending operation between the wire passage 14 and screw hole 15 and thus the connecter plate assumes the shape as shown in the side views with its spaced abutments on one end of the connecter plate to engage a box hole edge received thereinbetween and the wire passage 14 is on the other end.

Referring now to Figures 4, 5 and 6 for a description of an improved cable clamp bearing plate, or cable clamp, there is shown a part which may if desired be constructed of lighter weight sheet metal. The part consists of a bearing plate 20 including outstanding arms 21 and including if desired a cable passage 22 defined by prongs 23 or other suitable means so as to produce a cable passage 22 of satisfactory form and sufficiently large to permit the cable C to be passed therethrough.

The arms 21 are bent substantially at right angles to the bearing plate 20 and stand parallel above the plate to embrace the connecter plate 12. The cable clamp is fashioned into final form by subjecting it to a right angular bending operation so as to dispose the cable passage 22 at an angle or at right angles to the bearing plate 20 and it is then in completed form as shown in side elevation in Figure 8. This type of cable clamp is suitable for any connecter plate having a construction similar to that described and shown herein and having any type of box hole anchorage means.

The two main parts as above described are placed together as shown in the assembly views and the retaining arms 21 are bent on their outer ends to form overreaching fingers 23 by which the two parts 12 and 20 are movably held together in parallel relationship. The arms 22 reach alongside the edge of the connecter plate 12 and retain and guide the cable clamp 20 in movably free relation on the connecter plate 12. An inturned finger 23 is bent inwardly from each arm so that the arms 21 are caused to embrace the connecter plate to movably carry the clamp plate thereon. This assembly and relation of parts places the connecter plate end 13 and cable clamp ends 22 in parallel relationship thereby enabling these two ends 13 and 22 to embrace the wire and cable.

An operating means is carried by the connecter by which pressure is applied to force the two parts 12 and 20 apart. While a screw is shown as operating means, it is to be understood that any other element may be used by which reaction is produced between the parts to forcibly move them in opposite direction.

A screw 25 may be employed as operating means and is screw-threaded through the hole 15 and directed towards the cable C and the end of the screw is adapted to bear against and apply pressure to the cable bearing clamp plate 20. The screw threads through the connecter plate 12 and is adapted to react against the cable clamp 20 which reaches a stationary position when it bears on the cable. The screw may to advantage be carried on that part of the connecter which is designed to be placed on the inside of the box so that the operating means is actuated by application of a tool inserted inside of the box.

In using the connecter, it is mounted in the box by hooking the abutment tongue 17 through the box hole since that part is made small enough to fit through the box hole. The abutment corners 16 rest against the box wall adjacent the hole edge on the side of the box opposite the abutment 17 and thus the box hole edge rests between abutments 16 and 17 to anchor the connecter against longitudinal displacement. The screw is backed out or partly unscrewed to permit the cable clamp 20 to be lifted up close to the connecter plate 12 and thereupon the cable C is inserted. The wires W pass through the bushing hole or wire passage 14. The cable passage 22 permits the cable to rest close to the cable clamp plate 20 and the prongs 23 slide up and down by the cable during movement of the cable clamp.

The screw 25 is now run down towards the cable C. The cable clamp 20 receives the pressure of the screw and forcibly moves the cable laterally with respect to box hole axis and grips the cable against the exposed box hole edge portion H2. The reaction of the screw 25 and cable clamp 20 against the stationary cable causes the spaced abutment means 16 and 17 to be positively anchored in an overlapping manner against a box portion at the concealed or covered over box hole edge.

Thus the cable is attached to the box by actuation of a single operating means. The rigid exposed box hole edge is employed as the anchorage for both the cable and connecter resulting in certain advantages, namely, that of establishing positive electrical ground contact between a cable, where armored cable is used, and the box, and at the same time the connecter may be constructed relatively light since its function is to attach the cable to the exposed box hole edge rather than fasten the cable to the connecter.

What I claim is:

1. A connecter comprising two main parts and embodying a plate having box hole edge abutments, and formed to fit into a box hole and leave a part of its edge exposed to a cable, and provided with a screw threaded through the plate adjacent the abutments and pointed toward and adapted to react from a cable upon tightening of the screw to anchor the abutments in a box hole, a cable clamp mounted movably on the connecter under the screw end and adapted to be forced against a cable by said screw, and means including arms on the connecter integral with one part and reaching over the edge of the other part to hold together in movable relation the clamp and plate.

2. A connecter comprising two main parts and embodying a plate having box hole edge abutments, and formed to fit into a box hole and leave a part of its edge exposed to a cable, and provided with a screw threaded through the plate adjacent the abutments and pointed toward and adapted to react from a cable upon tightening of the screw to anchor the abutments in a box hole, a cable clamp mounted movably on the connecter under the screw end and adapted to be forced against a cable by said screw, and arms included on the cable clamp reaching past the edge of the connecter plate and bent at right angles and directed toward the screw to hold the plate and clamp together in movable relation.

3. A connecter comprising a flat plate adapted to fit into a box hole and formed to expose a part of its edge to a cable, provided with a wire passage at one end, and including box hole edge abutments formed on the other end, with a threaded screw hole placed between the abutments and wire passage, a screw mounted in the threaded hole, said plate being bent at right angles between the screw hole and wire passage; a cable clamp mounted movably on the plate and including a cable passage adapted to embrace a cable, and including a bearing plate placed under the aforesaid flat plate and screw and adapted to be engaged by the screw end, and retaining arms included on the bearing plate which reach up and around the end of the flat plate and retain the plate and cable clamp in movable relation.

4. A connecter comprising a plate adapted to fit into a box hole and formed to expose a part of the box hole edge to a cable, two corners of which plate are struck up to form abutments for one side of a box wall, and a reduced abutment neck between the corners extended beyond said struck up corners and turned at right angles on its end to form an abutment for the other side of a box wall, the abutments being long to prevent pivoting of the plate at the box wall, and a screw mounted in the plate adjacent the abutments and adapted to react from a cable.

5. A connecter comprising two main parts and embodying a plate having box hole edge anchorage means and formed to fit into a box hole and leave a part of its edge exposed to a cable, and provided with a screw threaded through the plate adjacent the box hole anchorage means and pointed toward and adapted to react from a cable upon tightening of the screw to anchor the box hole anchorage means in a box hole, a cable clamp mounted movably on the connecter under the screw end and adapted to be forced against a cable by said screw, and arms included on the cable clamp reaching past the edge of the connecter plate and bent at right angles and directed toward the screw to hold the plate and clamp together in movable relation.

6. A connecter comprising two main parts and embodying a plate having box hole edge anchorage means and formed to fit into a box hole and leave a part of its edge exposed to a cable, and provided with a screw threaded through the plate adjacent the box hole anchorage means and pointed toward and adapted to react from a cable upon tightening of the screw to anchor the box hole anchorage means in a box hole, a cable clamp mounted movably on the connecter under the screw end and adapted to be forced against a cable by said screw, arms included on the cable clamp reaching past the edge of the connecter plate and bent at right angles and directed toward the screw to hold the plate and clamp together in movable relation, and a wire passage in said cable clamp at right angles to the clamp plate.

In testimony whereof I affix my signature.

GEORGE C. THOMAS, Jr.